(12) United States Patent
Miller-Smith et al.

(10) Patent No.: US 12,198,433 B2
(45) Date of Patent: *Jan. 14, 2025

(54) SEARCHING WITHIN SEGMENTED COMMUNICATION SESSION CONTENT

(71) Applicant: Zoom Video Communications, Inc., San Jose, CA (US)

(72) Inventors: Andrew Miller-Smith, Chicago, IL (US); Renjie Tao, Sunnyvale, CA (US); Ling Tsou, Los Angeles, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,138

(22) Filed: Jan. 31, 2023

(65) Prior Publication Data

US 2024/0037941 A1    Feb. 1, 2024

Related U.S. Application Data

(63) Continuation of application No. 17/878,012, filed on Jul. 31, 2022, now Pat. No. 11,580,737.

(51) Int. Cl.
*G06K 9/00* (2022.01)
*G06V 10/762* (2022.01)
(Continued)

(52) U.S. Cl.
CPC ............ *G06V 20/41* (2022.01); *G06V 10/762* (2022.01); *G06V 20/49* (2022.01); *G06V 20/70* (2022.01); *G06V 30/19* (2022.01)

(58) Field of Classification Search
CPC ........ G06V 20/41; G06V 30/19; G06V 20/70; G06V 10/762; G06V 20/49;
(Continued)

(56) References Cited

U.S. PATENT DOCUMENTS

2013/0191415 A1    7/2013  Ambwani et al.
2014/0129942 A1*  5/2014  Rathod ............ H04N 21/44226
                                                              715/720
(Continued)

OTHER PUBLICATIONS

H. Li and A. Dong, "Hierarchical Segmentation of Presentation Videos through Visual and Text Analysis," 2006 IEEE International Symposium on Signal Processing and Information Technology, 2006, pp. 314-319 (Year: 2006).*

(Continued)

*Primary Examiner* — Michael J Vanchy, Jr.
(74) *Attorney, Agent, or Firm* — Young Basile Hanlon & MacFarlane, P.C.

(57) ABSTRACT

Methods and systems provide for search results within segmented communication session content. In one embodiment, the system receives a transcript and video content of a communication session between participants, the transcript including timestamps for a number of utterances associated with speaking participants; processes the video content to extract textual content visible within the frames of the video content; segments frames of the video content into a number of contiguous topic segments; determines a title for each topic segment; assigns a category label for each topic segment; receives a request from a user to search for specified text within the video content; determines one or more titles or category labels for which a prediction of relatedness with the specified text is present; and presents content from at least one topic segment associated with the one or more titles or category labels for which a prediction of relatedness is present.

20 Claims, 9 Drawing Sheets

(51) Int. Cl.
*G06V 20/40* (2022.01)
*G06V 20/70* (2022.01)
*G06V 30/19* (2022.01)

(58) Field of Classification Search
CPC .. G06F 16/7844; G06F 16/435; G06F 16/685; G06F 16/783; G06F 16/90344; G06F 3/167; G06F 40/20; G06F 40/279; H04N 21/4394; H04N 21/23418; H04N 21/234345; H04N 21/26258; H04N 21/26603; H04N 21/2743; H04N 21/278; H04N 21/4332; H04N 21/4334; H04N 21/44008; H04N 21/440236; H04N 21/458; H04N 21/4622; H04N 21/4821; H04N 21/4826; H04N 21/4828; H04N 21/4884; H04N 21/8126; H04N 21/8456; H04N 21/858; G06N 20/00; G06Q 10/101; G10L 15/18; G10L 15/22; G10L 15/26; G10L 2015/223; G11B 27/28
See application file for complete search history.

(56) References Cited

U.S. PATENT DOCUMENTS

2016/0227282 A1\* 8/2016 Chang ................ H04N 21/4334
2018/0035152 A1\* 2/2018 Jassin .............. H04N 21/23418
2022/0013114 A1   1/2022 Camenares et al.

OTHER PUBLICATIONS

T. Tuna, M. Joshi, V. Varghese, R. Deshpande, J. Subhlok and R. Verma, "Topic based segmentation of classroom videos," 2015 IEEE Frontiers in Education Conference (FIE), 2015, pp. 1-9 (Year: 2015).\*

International Search Report and Written Opinon mailed on Oct. 5, 2023 in corresponding PCT Application No. PCT/US2023/028819.

\* cited by examiner timestamp: 0
title: Welcome to All Hands
texts:
text_0: Welcome to All Hands
text_1: April 2, 2020
text_2: zoom

FIG. 4B

SEARCHING WITHIN SEGMENTED COMMUNICATION SESSION CONTENT

CROSS-REFERENCE TO RELATED APPLICATIONS

This application is a continuation of U.S. Non-Provisional application Ser. No. 17/878,012, filed on Jul. 31, 2022, which is hereby incorporated by reference in its entirety.

FIELD OF INVENTION

The present invention relates generally to digital communication, and more particularly, to systems and methods for providing search results within segmented communication session content.

SUMMARY

The appended claims may serve as a summary of this application.

BRIEF DESCRIPTION OF THE DRAWINGS

The present invention relates generally to digital communication, and more particularly, to systems and methods providing for providing search results within segmented communication session content.

The present disclosure will become better understood from the detailed description and the drawings, wherein:

FIG. 4B is a diagram illustrating textual content that has been extracted from a frame of video content.

DETAILED DESCRIPTION

Figure 1A:
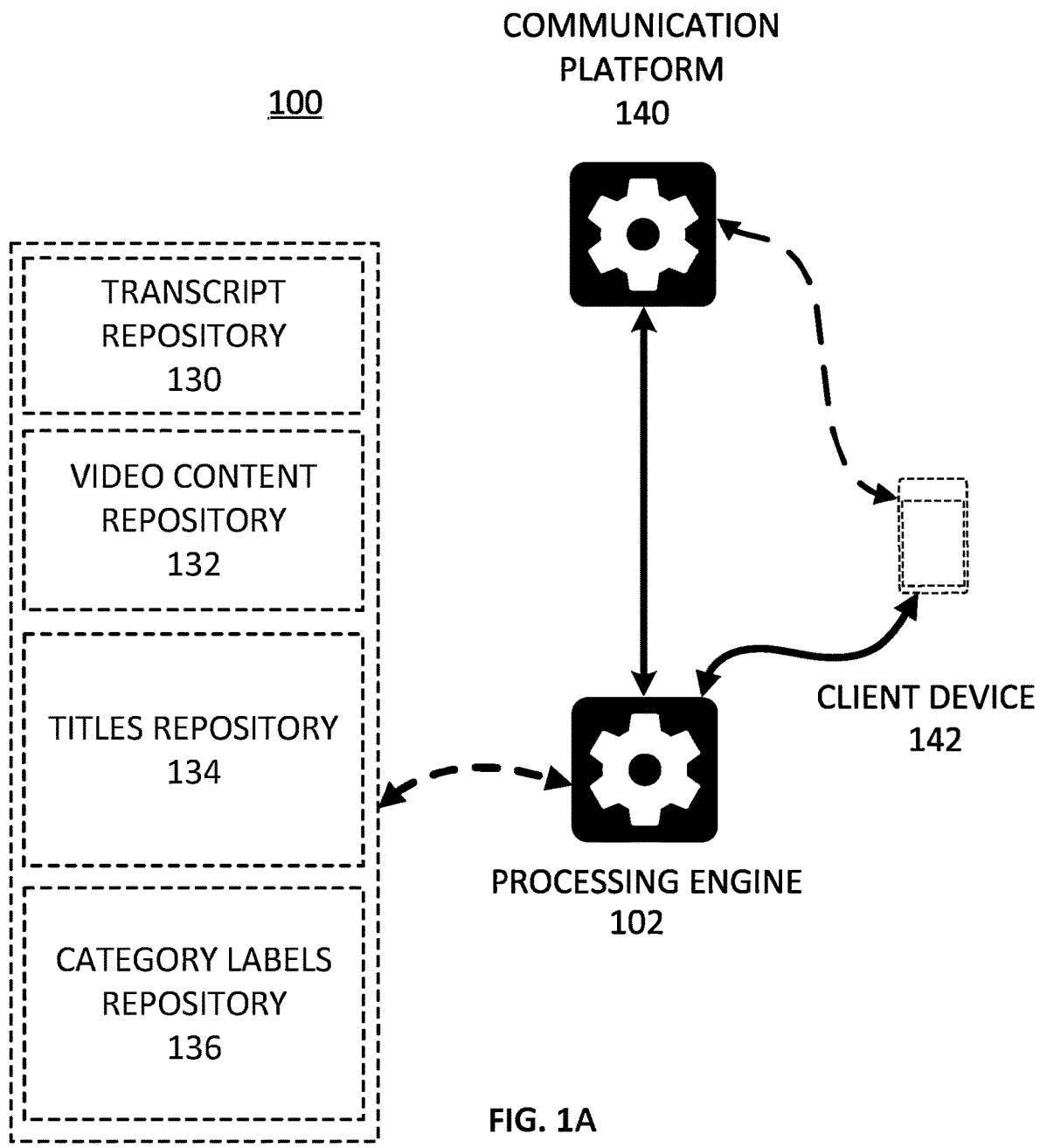
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, when navigating through recorded video of a communication session, reviewing a sales meeting can be difficult and time consuming, as sales meeting can often run for 30-60 minutes, and a large amount of time is often spent on scrolling through the meeting to find the portion or topic the user is looking for. Additionally, past sales meetings can be difficult to search for, as there is no way to search for specific topics of discussion for specific prospective customers. Additionally, presentation slides and other presented content within a communication session may contain text which a user may wish to return to and read easily at a later date.

Thus, there is a need in the field of digital communication tools and platforms to create a new and useful system and method for providing search results within segmented communication session content. The source of the problem, as discovered by the inventors, is a lack of ability to dynamically segment a meeting into chapters based on recorded video content of the meeting, including text extracted from the video content; a lack of ability to determine titles and category labels for those chapters based on text extracted from the recorded video content; and a lack of ability for users to search within the content of meetings to find content pertaining to titles and category labels which are related to the specified search text.

In one embodiment, the system receives a transcript and video content of a communication session between participants, the transcript including timestamps for a number of utterances associated with speaking participants; processes the video content to extract one or more pieces of textual content visible within the frames of the video content; segments frames of the video content into a number of contiguous topic segments; determines a title for each topic segment from one or more of: the transcript, and the extracted textual content; assigns a category label for each topic segment from a prespecified list of category labels; receives, from a client device associated with a user, a request to search for specified text within the video content; in response to receiving the request, determines one or more titles or category labels for which a prediction of relatedness with the specified text is present; and presents, to the client device, content from at least one topic segment associated with the one or more titles or category labels for which a prediction of relatedness is present.

In some embodiments, at least one input for the system is a meeting transcript which contains a list of utterances with timing and speaker information, and at least one other input is video content that has recorded capturing the communication session, including, e.g., presentation slides, screens or desktops shared, or any other content which may be displayed or presented by participants during the communication session.

An exemplary method for the system includes four key components: topic segmentation, title generation, category label assignment, and a user search within video content with presented search results. A meeting typically contains several topics, e.g., subjects or aspects of discussion. An exemplary method segments the meeting based on the meeting content and topics; generates a title for each segment; and assigns a category label for each segment. Such a method is a post-session feature, rather than a feature that is performed in real-time during a session. Each of these components will be described in further detail below.

Category labels may be differentiated from titles in several possible ways. In various embodiments, one purpose of category labels is to provide structural information such that cross-meeting analysis can be done on a specific category. This makes category-specific aggregation possible, for example. The type of task involved in assigning category labels is primarily one of classification. The output can be one category label from a prespecified list of category labels. In some embodiments, the method of assignment involves clustering using topic modeling.

On the other hand, in various embodiments, one purpose of a title for a topic segment is to provide some insight into the content within that topic segment. The type of task involved in determining a title may include generation or extraction. The output of a title may be any string, rather than a selection from a prespecified list. In some embodiments, the method of determining a title involves text extraction following by ranking of top phrases within the segment.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 142 is connected to a processing engine 102 and, optionally, a communication platform 140. The processing engine 102 is connected to the communication platform 140, and optionally connected to one or more repositories and/or databases, including, e.g., a transcript repository 130, video content repository 132, titles repository 134, and/or category labels repository 136. One or more of the databases may be combined or split into multiple databases. The user's client device 142 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
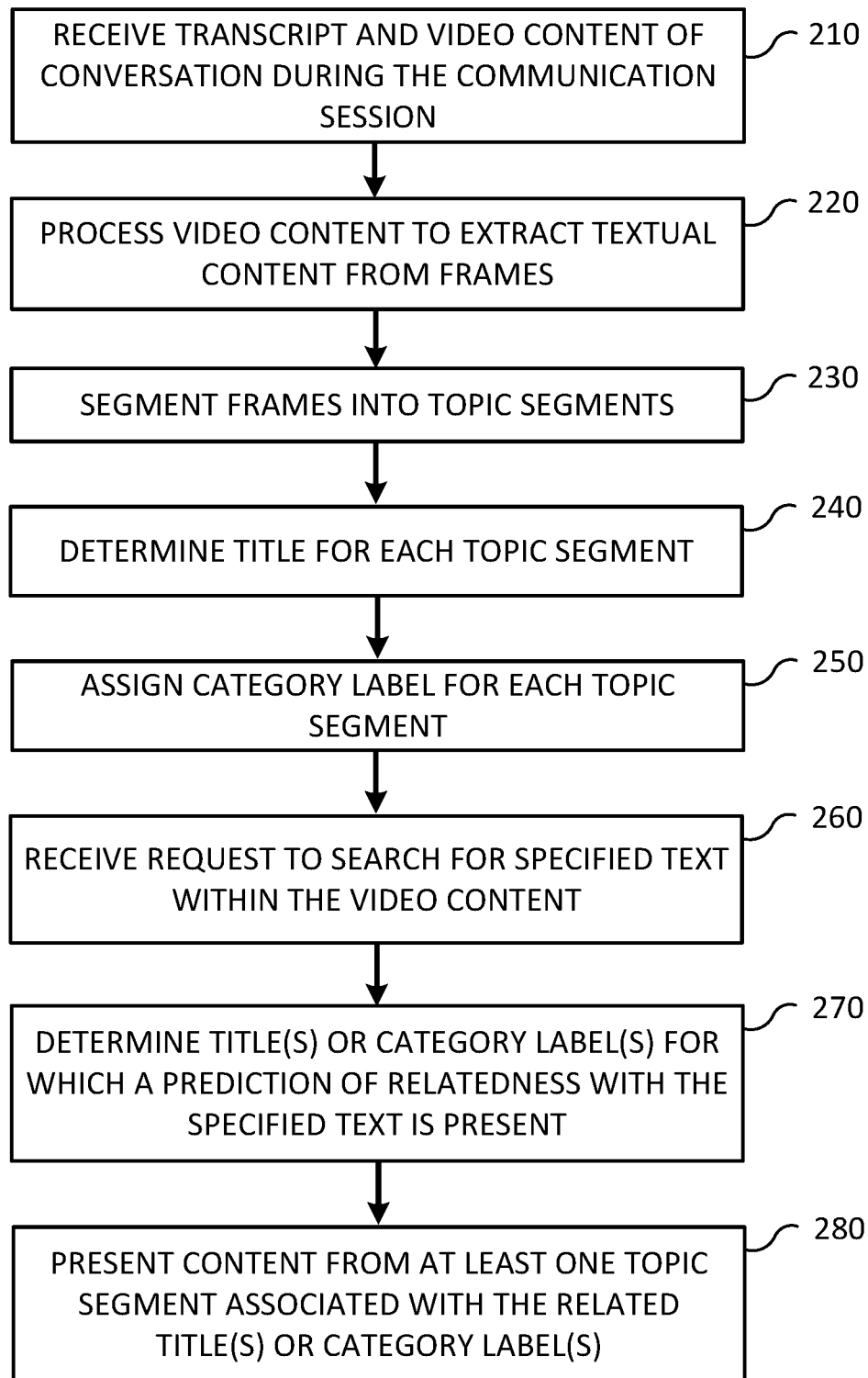
FIG. 2 is a flow chart illustrating an exemplary method that may be performed in some embodiments.

In an embodiment, the processing engine 102 may perform the exemplary method of FIG. 2 or other method herein and, as a result, provide search results within segmented communication session content. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 142 is a device with a display configured to present information to a user of the device who is a participant of the video communication session. In some embodiments, the client device presents information in the form of a visual UI with multiple selectable UI elements or components. In some embodiments, the client device 142 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 142. In some embodiments, one or more of the communication platform 140, processing engine 102, and client device 142 may be the same device. In some embodiments, the user's client device 142 is associated with a first user account within a communication platform, and one or more additional client device(s) may be associated with additional user account(s) within the communication platform.

In some embodiments, optional repositories can include a transcript repository 130, video content repository 132, title repository 134, and/or category label repository 136. The optional repositories function to store and/or maintain, respectively, a transcript for the communication session; recorded video content for the communication session; titles determined for topic segments; and category labels assigned to topic segments. The optional database(s) may also store and/or maintain any other suitable information for the processing engine 102 or communication platform 140 to perform elements of the methods and systems herein. In some embodiments, the optional database(s) can be queried by one or more components of the exemplary environment 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communicating with one another by video), or many-to-many (e.g., multiple participants video conferencing with each other in a remote group setting).

Figure 1B:
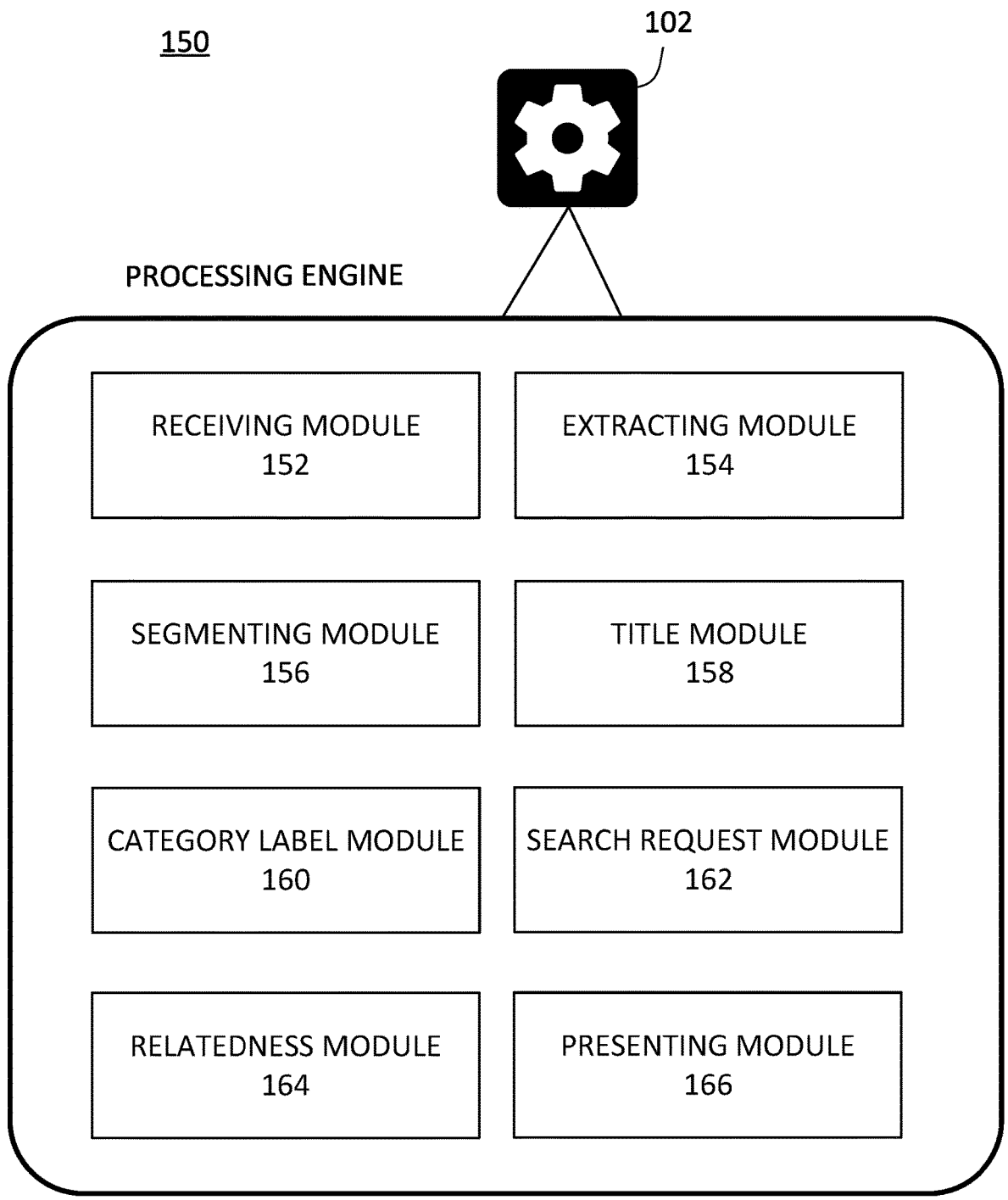
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive a transcript and video content of a communication session between participants, the transcript including timestamps for a number of utterances associated with speaking participants.

Extracting module 154 functions to process the video content to extract one or more pieces of textual content visible within the frames of the video content.

Segmenting module 156 functions to segment frames of the video content into a plurality of contiguous topic segments.

Title module 158 functions to determine a title for each topic segment from one or more of the transcript and the extracted textual content.

Category label module 160 functions to assign a category label for each topic segment from a prespecified list of category labels.

Search request module 162 functions to receive, from a client device associated with a user, a request to search for specified text within the video content.

Relatedness module 164 functions to determine one or more titles or category labels for which a prediction of relatedness with the specified text is present.

Presenting module 166 functions to present, to the client device, content from at least one topic segment associated with the one or more titles or category labels for which a prediction of relatedness is present.

The above modules and their functions will be described in further detail in relation to an exemplary method below.

FIG. 2A is a flow chart illustrating an exemplary method that may be performed in some embodiments.

At step 210, the system receives a transcript and video content of a communication session between participants, the transcript including timestamps for a number of utterances associated with speaking participants. In various embodiments, a communication session may be, e.g., any remote video session, audio session, chat session, or any other suitable communication session between participants. In some embodiments, the communication session can be hosted or maintained on a communication platform, which the system maintains a connection to in order to connect to the communication session. In some embodiments, the system displays a user interface ("UP") for each of the participants in the communication session. The UI can include one or more participant windows or participant elements corresponding to video feeds, audio feeds, chat messages, or other aspects of communication from participants to other participants within the communication session.

The transcript the system receives relates to a conversation between the participants that is produced during the communication session. That is, the conversation which was produced during the communication is used to generate a transcript. In various embodiments, the transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript is generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

The video content the system receives is any recorded video content that captures the communication session. The video content can include any content that is shown within the communication session, including, e.g., video feeds showing participants, presentation slides which are presented during the session, screens, desktops, or windows which are shared, annotations, or any other suitable content which can be shared during a communication session. The video content is composed of a multitude of frames. In some embodiments, the system receives the video content from a client device which was used by a participant to connect to the communication session. In some embodiments, the video content is generated by a client device, or the system itself, during and/or after the communication session. In some embodiments, video content of a session may be recorded upon a permitted participant, such as a host of the session, selecting one or more "record" options from their user interface. In other embodiments, the video content may be recorded automatically based on a user's preferences.

At step 220, the system processes the video content to extract one or more pieces of textual content visible within the frames of the video content. In some embodiments, this extraction of textual content is performing using optical character recognition ("OCR"). In some embodiments, the system further processes the video content to extract, via OCR, one or more titles visible within the frames of the video content.

In some embodiments, as part of this textual extraction, the system performs one or more of the following: extracting frames from the video content; classifying the frames using a frame classifier; identifying one or more distinguishing frames; detecting a title within each distinguishing frame; cropping a title area within the frame; extracting a title from the cropped title area via OCR; extracting textual content from distinguishing frames via OCR; and transmitting the extracted textual content and extracted titles to one or more client devices and/or elsewhere within the system. In some embodiments, low-resolution and high-resolution versions of frames may be extracted, and a process for analyzing low-resolution frames and extracting from high-resolution versions of those frames may be performed to allow for a faster, more efficient extraction of textual content. In some embodiments, one or more frames may be filtered out if they do not contain text, or if they are frames of a type which does not contain text (i.e., black frames or face frames). In some embodiments, a title may be detected within a distinguishing frame based on a You Only Look Once (YOLO) model or similar model.

At step 230, the system segments the frames of the video content into a number of contiguous topic segments. The topic segmentation process is a key component of the system herein, and functions to segment a meeting into contiguous coherent sections. In some embodiments, video-based segmentation is performed, as well as transcript-based segmentation. Both will be described in further detail below.

In some embodiments, video-based topic segmentation is performed. In various embodiments, video-based topic segmentation may involve use of a frame classifier. By classifying video frames into a number of categories, e.g., 4 categories, consecutively-same frames of video can be grouped within a single segment. Such categories may be, e.g., black frames (i.e., empty or devoid of content), face frames (i.e., frames where faces of participants are shown via their respective video feeds), slide frames (i.e., frames in which presentation slides are being presented), and demo frames (i.e., frames where a demonstration of a product, technique, or similar is being presented).

In some embodiments, video-based topic segmentation may further involve the use of distinguishing frames within a segment containing a presentation slide. In some embodiments, presentation slides which are shown during a session may be considered special types of frames, because most of such presentation slides contain a title, which may be in a header area or similar area within the slide. In some embodiments, a separate title detection model may be employed to detect a title within presentation slides. In some embodiments, a change of a slide title may be considered as defining of a distinguishing frame or key frame, i.e., a frame with new or changed content that can be considered a direct indication of a new topic segment. An example of video-based topic segmentation is described below with respect to FIG. 3.

In some embodiments, transcript-based topic segmentation is performed, either parallel to or in addition to video-based segmentation. Video-based segmentation is sometimes a long process, and video-generated category labels and titles may sometimes only contain high-level information. In some embodiments, in order to obtain fine-grained segments and titles, after the system obtains the segments using video, the system can perform transcript-based segmentation (as well as transcript-based title determination, described further below) using natural language text on each topic segment. Some potential steps are described below.

In some embodiments, the system may further segment one or more of the topic segments. In some embodiments, the system may perform content vector segmentation ("CVS") on topic segments which are determined to be longer than a preset threshold. In some embodiments, CVS functions to score the coherence of each segment with a content vector scoring function and utterance embeddings, then uses dynamic programming to find the optimal segment splits. After performing CVS, each long video segment will contain a number of text segments. Only the first text segment is assigned the video segment title if the frames of the segment are classified as demo or slide frames. The rest of the segment titles are generated later.

In some embodiments, the system merges one or more neighboring segments according to one or more merging rules. In some embodiments, when a text segment is too short, the system merges it with one of its neighbors such that the resulting segment is as short as possible. In some embodiments, if the short segment has a category different from both the previous and next segments, or has a category that is the same within both segments, then the system merges it with one of the neighboring segments such that the resulting segment is as short as possible. Otherwise, the system merges the short segment with the one that has the same category.

In some embodiments, the system performs title determination on each segment if it does not have a video title, as described in further detail below. In some embodiments, the title determination algorithm generates a number of top title candidates, and uses a ranker to select the best title. In some embodiments, one or more rules and/or a profanity check can also be applied. In some embodiments, the merging rules include the system merging neighboring segments with the same title. In some embodiments, the merging rules include the system merging neighboring segments when one of the segments does not meet a threshold length.

At step 240, the system determines a title for each topic segment. This determination of a title may be performed using one or more of the transcript, and the extracted textual content from previous steps.

In some embodiments, the system determines a title based on the transcript. Transcript-based title generation may involve the steps of candidate generation and ranking, described in further detail below.

With respect to candidate generation, in some embodiments, parts-of-speech ("POS") tagging is first applied to the text segment. Each word in the text segment is assigned a label such as "NN" (i.e., noun), "JJ" (i.e., adjective), and so on. In such a way, a grammar can be used to generate a list of possible candidates for the title, including, for example, noun phrases, verb phrases, prepositional phrases, clauses, and more.

With respect to ranking, in some embodiments, the following steps may be performed. For each of the above candidates, a list of features are computed and a final score is calculated based on the features. The candidate with the highest score is assigned as the final title. A number of features may be determined by the system as part of the ranking of candidates, as described below.

First, in some embodiments, a similarity feature may be calculated. In some embodiments, the system captures the similarity between a candidate title and the text segment. A high similarity score is preferred. In some embodiments, the steps are as follows: (1) computing an embedding for a candidate title using a Sentence Transformer; (2) computing an embedding for a text segment using a Sentence Transformer; and (3) calculate the cosine similarity of the two embeddings above.

Second, in some embodiments, inverse document similarity ("IDS") features are determined by the system. This captures the dissimilarity between the candidate title and the overall text of the transcript. In one exemplary situation, the text segment is similar to the current text segment, but dissimilar to the overall transcript. The IDS features capture the latter part. A high IDS score is preferred, which corresponds to a higher dissimilarity between the candidate and the overall transcript. In some embodiments, the IDS scores are further normalized, as they may have outliers.

Third, in some embodiments, a position feature is determined by the system. In some embodiments, there is a higher probability that the final title may occur early in the text segment compared to much later in the text segment. A position feature can capture this by calculating a score in the range [0,1]. The candidate would have a score of 1 if it appears in the very beginning of the segment, and a score of 0 if it appears in the very last. In some embodiments, the system can determine a ranking score for each candidate as the weighted sum of the above features, and the candidate with the highest score is chosen as the title for the segment.

At step 250, the system assigns a category label for each topic segment from a prespecified list of category labels. In some embodiments, the system assigns the category labels using the transcript and the topic segments as inputs. In some embodiments, the system assigns the category labels based on a prespecified list of category labels which may be used for assignment. An example of such is described with respect to FIG. 6.

In some embodiments, assigning the category label for each topic segment is performed in part using named entity masking techniques. In some embodiments, NER (described above) may be used on each of the transcript utterances. The system may then mask one or more named entities with their corresponding symbols. For example, the named entity "MONEY" may be masked with the corresponding symbol "_MONEY_", and the named entity "PERSON" may be masked with the corresponding symbol "_PERSON_".

In some embodiments, assigning the category label for each topic segment is performed in part using topic model inferencing techniques, in order to assign a category for a current segment. A number of steps may be involved in this topic model inferencing, as outlined below.

First, a TF-IDF score is extracted using a vectorizer trained offline. Next, the system can perform topic model inferencing using a topic model trained offline. In some embodiments, this topic model may contain a fixed number of topics which were obtained using an unsupervised method and are different from the prespecified list of category labels. The system may then obtain the top topics with the highest predicted scores, and set the topic with the highest score as the target topic. Next, the system may find, among the top topics, the topics that are in the prespecified list of category labels, and select the one with the highest score. In some embodiments, an exception may occur if the highest-scoring topic is mapped to a particular category label such as, e.g., "Product", and a next highest topic may be elected that is not mapped to that category label. If one can be obtained that is close to the previous highest score, the system will select that topic instead. In some embodiments, if none of the highest-scoring topics are listed in the prespecified list of category labels, then the system may return the topic with the highest score.

In some embodiments, the system verifies whether the selected topic is in the prespecified list. If it is, the system can set the mapped topic as the assigned category label for the topic segment. Otherwise, the system may assign the category label for the topic segment as a generalized category label, such as, e.g., "General Discussion".

In some embodiments, the system may additionally adjust one or more assigned category labels for segments if any predefined post-processing rules are applicable. Such post-processing rules may apply to specific category labels such as, e.g., "Greeting", "Closing", or "Break". In some embodiments, one adjustment operation includes assigning an ambiguous topic to a prespecified category label based on a position of the ambiguous topic segment within the communication session. In some embodiments, one adjustment operation includes assigning an ambiguous topic to a prespecified category label based on which participant is speaking with the highest frequency during the topic segment. In some embodiments, at least one smoothing operation includes determining that a topic segment does not meet a threshold duration requirement, and then merging the topic segment with one or both of its neighboring topic segments. In some embodiments, at least one adjustment operation includes discounting and removing an utterance level score if it does not meet a threshold value.

In some embodiments, offline training of an AI model is performed prior to the system assigning the category label using the AI model. In some embodiments, an unsupervised clustering method is used for training. In some embodiments, an IDF of the training corpus, i.e., a TF-IDF vectorizer, must be obtained during offline training, as well as a topic model. In some embodiments, the system can train the TF-IDF vectorizer with, e.g., 3-gram, top 3000 features, stop words removed, or a lemma tokenizer. In some embodiments, the system can train the topic model using non-negative matrix factorization ("NMF") to cluster and extract top key phrase features. Once topic groups are obtained, the system may examine top key phrases and map them to prespecified category labels.

At step 260, the system receives, from a client device associated with a user, a request to search for specified text within the video content.

In some embodiments, a user interface is presented to a user of the client device. Within the user interface, a request window can be presented to the user which allows the user to request a search to be performed. In some embodiments, the request window allows a text field for entering one or more search terms, words, or phrases. In some embodiments, the request window enables the user to present the requested specified text verbally into a microphone capturing the user's voice. In some embodiments, one or more recommended search terms may be presented based on one or more of the extracted textual content, determined titles for topic segments, and/or category labels assigned to topic segments. A user may select one of the recommended terms as the specified text. In some embodiments, at least a portion of the specified text includes one or more titles detected within the frames of the video content.

In some embodiments, the specified text within the request includes at least one of: one or more words, one or more phrases, one or more numbers, and one or more symbols. In some embodiments, the user may modify the specified text at any point to change the search and be presented with different search results.

At step 270, in response to receiving the request, the system determines one or more titles or category labels for which a prediction of relatedness with the specified text is present.

In some embodiments, an intent detection algorithm is employed to determine whether one or more predictions of relatedness are present between the specified text and one or more titles and/or category labels determined for the topic segments. In some embodiments, the intent detection algorithm functions by identifying utterances in the transcript which indicate one or more areas of interest that should be brought to the attention of the user. In some embodiments, the identity detection algorithm is an AI algorithm, such as, e.g., a deep learning, meta-learning, or other AI algorithm which makes use of neural networks. In some embodiments, the intent detection algorithm performs the determination of predictions of relatedness without any pre-training, i.e., without making use of training data.

In some embodiments, the intent detection algorithm makes use of prototypical neural networks ("Prot® Nets") in order to perform intention detection tasks in low data regimes where there may be limited or no pre-training or training data used.

In such cases, the algorithm functions based on the idea that there exists an embedding space in which points cluster around a single prototype representation for each class. The algorithm then learns a non-linear mapping that projects input sentences or phrases into that embedding space, using a neural network. The algorithm takes the class's prototype to be the means of its support set in the embedding space.

In some embodiments, few-shot intent detection techniques are employed, where few-shot prototypes are computed as the mean of embedded support examples for each class. In other embodiments, zero-shot intent detection techniques are employed, where zero-shot prototypes are produced by embedding class meta-data. In either case, embedded query points are classified via a softmax over distances to class prototypes.

In some embodiments, pre-trained language models, such as, e.g., pre-training sentence embedding language models, are employed. For example, in various embodiments, the algorithm may employ one or more open source language model libraries for sentence transformer models, such as, for example, RoBERTa, BERT, all-mpnet-base-v2, or all-MiniLM-L6-v2. In some embodiments, this training functions to allow the encoder to learn to project sentences or phrases into a meaningful latent space, i.e., a space where the algorithm can perform distance computations and assign a query to its prototype.

In some embodiments, such models are trained within a meta-learning framework. In such cases, the meta-learning framework allows the model to generalize well to new classes at test time. Within such a meta-learning framework, the model is presented with a brand new task with unseen inputs and unseen classes that the model has never been exposed to during training. This differs from traditional ML where at test time there are unseen inputs, but the ML model is asked to predict the same classes. In this case, the model is asked to learn to predict new classes given new inputs, and thus is forced to generalize to unseen data, which is important to few-shot settings in particular where the model needs to quickly adjust to new data and classes.

In some embodiments, matching networks are employed to provide a way to assign a class label to a query, where the encoder learns to project sentences or phrases into the learned embedding space and then outputs the class that is closer in distance to the embedded queries. In some embodiments, whenever a number of example phrases is greater than 1, the algorithm aggregates those phrases into so-called prototypes, and assigns the class based on the closest prototype. In some embodiments, once those prototypes are derived in embedding space, class assignment is made based on distance metrics. In some embodiments, the distance criteria may be a calculation of Euclidean distance, while in other embodiments, the distance criteria may be a calculation of cosine similarity.

In some embodiments, the algorithm functions to classify utterances from the transcript not just within existing categories, but also to potentially classify utterances as not related to any of the existing categories. In this way, "out of scope" classifications may exist for utterances which the algorithm deems do not fit into any existing category.

At step 280, the system presents, to the client device, content from at least one topic segment associated with the one or more titles or category labels for which a prediction of relatedness is present.

Varying embodiments may present this content in a variety of ways. In some embodiments, the content may be presented as in a traditional search engine displaying search results, with a number of results being displayed as the user scrolls down, and with some context or snippets of text around the related titles or category labels being provided as well. In some embodiments, a title detected within a frame may be presented along with other text from a given slide or topic segment. In some embodiments, a thumbnail of a frame with a related title or category label in it may be presented.

In some embodiments, the system ranks the relatedness between the specified text and one or more titles or category labels based on a relevance score. The content of the topic segments is then presented by the system to the client device in order of ranking of the associated titles and category labels for those segments. In some embodiments, the relevance score is based on one or more of: the specified text, user preferences, user behavior, user search history, and popularity of the titles and/or category labels which may be related.

In some embodiments, the content is presented to the client device in chronological order based on the associated timestamps.

In some embodiments, the system presents the frame associated with each related title and/or category label, with the related title and/or category label visually highlighted within the presented frame. In some embodiments, the system presents the full textual content from the frame associated with each related title and/or category label, the title and/or category label being visually highlighted within the presented full textual content. In some embodiments, the system presents one or more frames associated with the related title and/or category label and one or more pieces of textual content associated with the frames, with the title and/or category label being visually highlighted within the pieces of textual content associated with the frames.

In some embodiments, the system presents a subset of the textual content from the frame associated with each related title and/or category label, the title and/or category label being visually highlighted within the presented subset of the textual content. In some embodiments, the system identifies, from the frame associated with each related title and/or category label, a contextual portion of the textual content representing a context. The presented subset of the textual content is the contextual portion of the textual content. In some embodiments, the presented subset is determined based on the available space within a window for presenting the subset.

In some embodiments, one or more excerpts of transcript text may be presented with related title and/or category labels. In some embodiments, a user may opt to navigate between search results within transcript text, search results within frames, and related titles and/or category labels within extracted text; or may navigate between some combination thereof.

Figure 3:
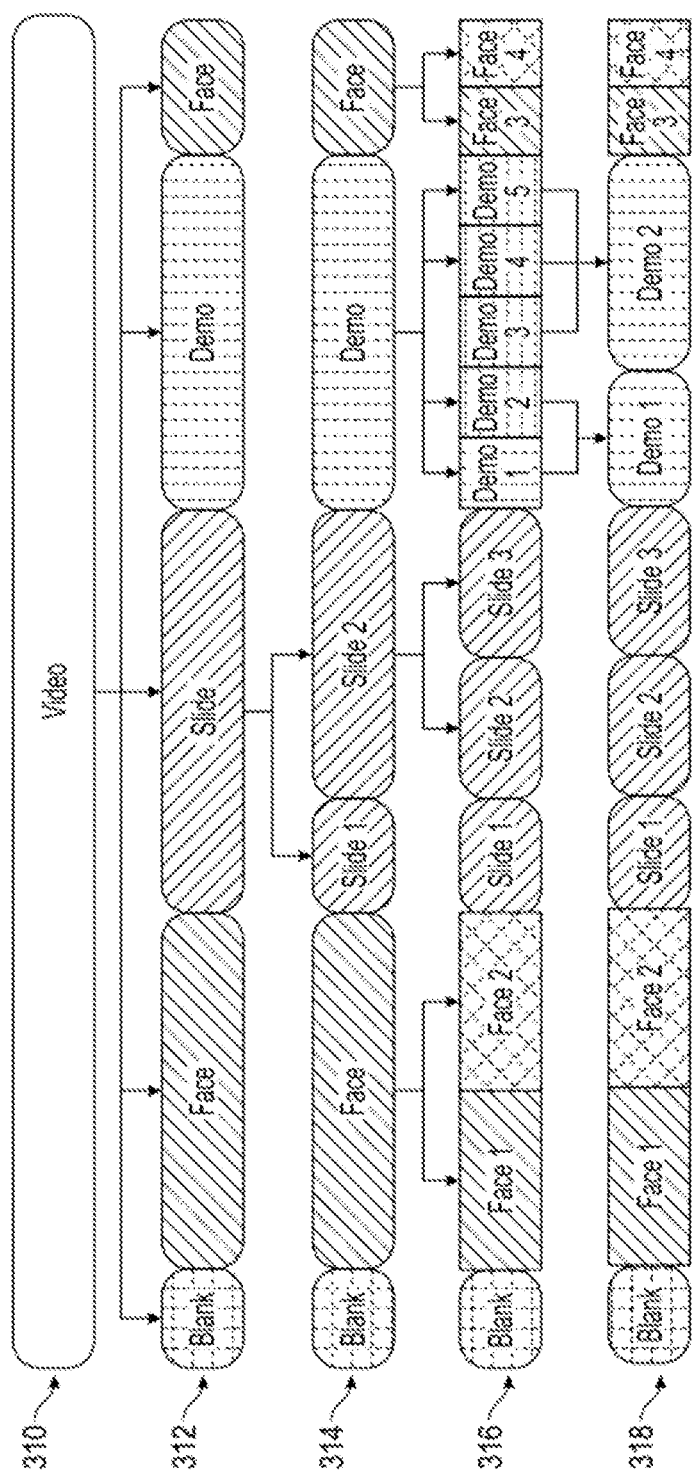
FIG. 3 is a diagram illustrating one example embodiment of segmentation of video content into topic segments.

FIG. 3 is a diagram illustrating one example flow chart for segmentation of video content into topic segments. The illustrated flow chart shows one example of video-based topic segmentation, as described above.

At step 310, a video timeline is presented from a beginning of a video on the left, to an ending of the video on the right. At step 312, the system uses a frame classifier to classify the frames of the video into different types. As a result, the system classifies that the video is first blank, then starts with a face-to-face meeting involving chatting between participants ("Face"). The video then follows with a slide section ("Slide"), then a demonstration section ("Demo") after that. The video then concludes with more face-to-face chatting between participants ("Face"). As a result, the meeting can be segmented into 5 topic segments (i.e., chunks), as delineated in step 312.

At step 314, the system identifies distinguishing frames within the slides. The "Slide" segment is further segmented into 2 slides, as a distinguishing frame was found at the start of the second slide segment.

At step 316, the system performs CVS on the "Face" and "Demo" segments, as well as on any slides in the "Slide" section that are deemed too lengthy. The "Face", "Slide", "Demo", and second "Face" sections are further segmented as a result.

Finally, at step 318, the system performs post-processing by merging neighboring slides if they are too short. Thus, several "Demo" segments are merged into 2 segments.

Figure 4A:
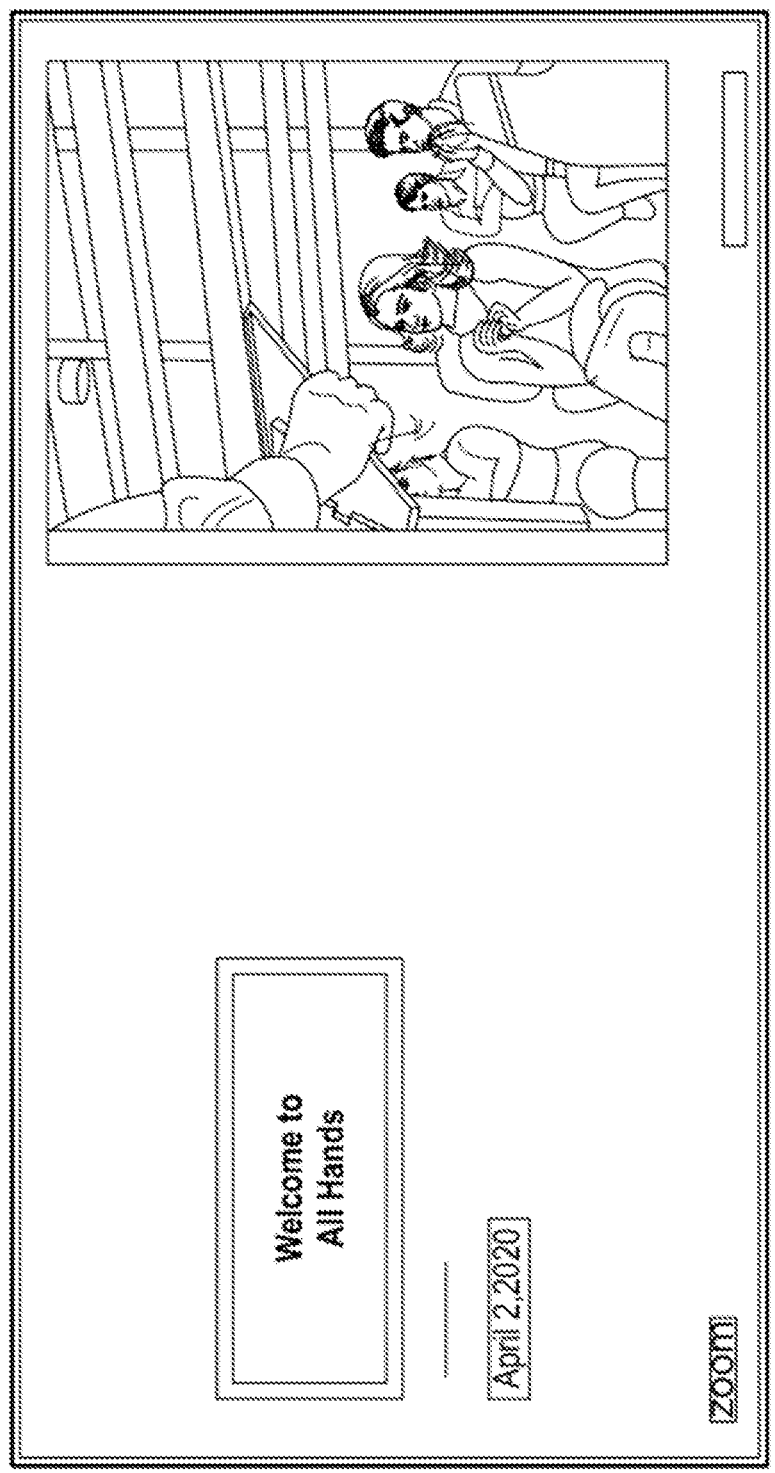
FIG. 4A is a diagram illustrating extraction of textual content from a frame of video content.

FIG. 4A is a diagram illustrating extraction of textual content from a frame of video content. As described above with respect to FIG. 2, text may be extracted from one or more frames of the video content. In the illustrated example, a presentation slide is shown. A title area is present, with a title that reads, "Welcome to All Hands". A date and company name are further provided below the title.

FIG. 4B is a diagram illustrating textual content that has been extracted from a frame of video content. The presentation slide illustrated in FIG. 4A has had its text extracted using one or more processes described above with respect to FIG. 2. The extracted text includes an extracted title, timestamp associated with the frame of the video content, and three separate pieces of textual content that have been extracted.

Figure 5:
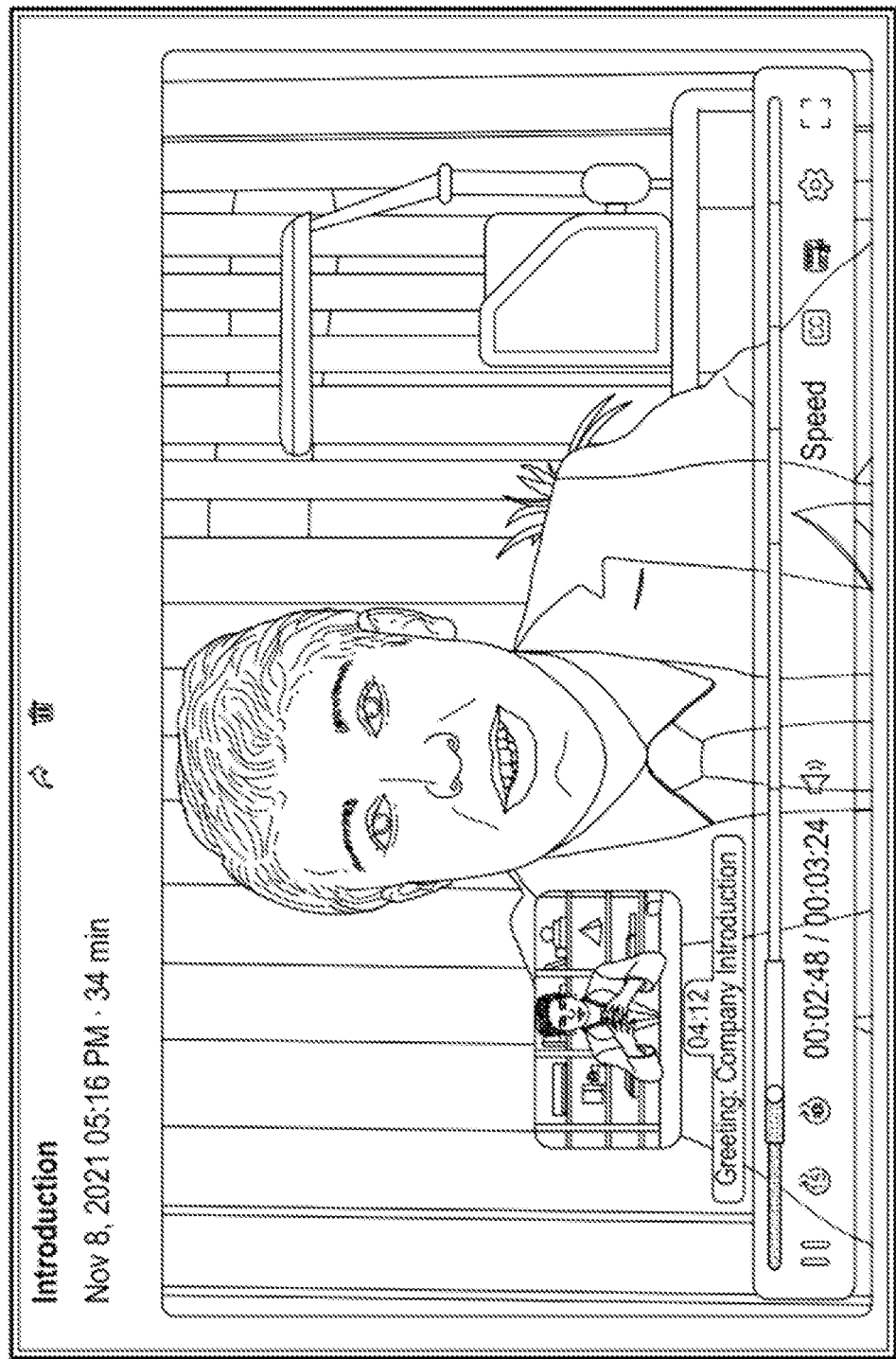
FIG. 5 is a diagram illustrating playback of video content with topic segments, title, and category label being presented.

FIG. 5 is a diagram illustrating playback of video content with topic segments, title and category label being presented.

In the illustration, recorded playback can be accessed by a user. In some embodiments, the user is a user of the communication platform with access or permission to view the recorded playback of the communication session. The user may also be a host of the meeting, administrator, or other account with access privileges. The title of the meeting is listed ("Introduction"), along with the date, time, and duration of the meeting. At the bottom of the illustration, playback and navigation elements are provided, along with other controls related to the viewing experience. A timeline is provided. The timeline is visually segmented into different sections to represent the different topic segments of the conversation which were dynamically generated. The user can hover a mouse pointer, for example, to view a preview image of that portion of the video. Along with the preview image, the assigned category label and determined title for that segment are displayed as "Greeting: Company Introduction". In the illustrated example, the assigned category label is "Greeting" and was selected from a prespecified list of category labels, and the determined title is "Company Introduction" and was determined based on one or more of the title determination steps detailed above with respect to FIG. 2.

Figure 6:
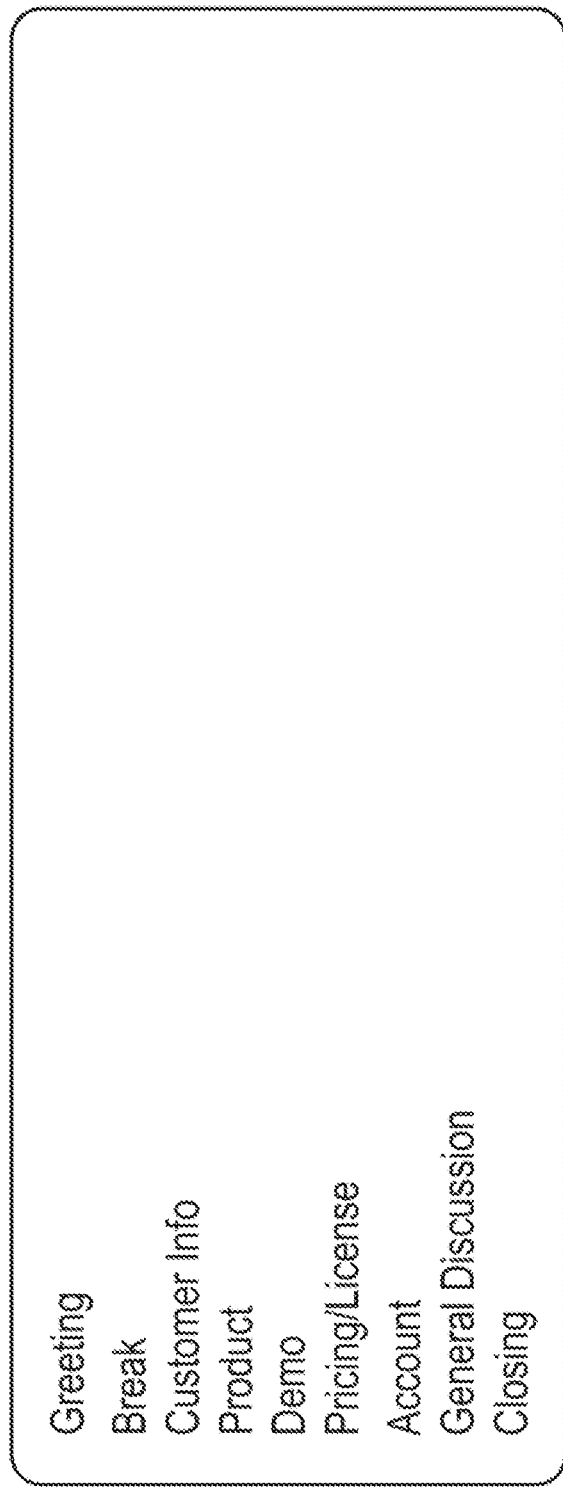
FIG. 6 is a diagram illustrated an example of a prespecified list of category labels.

FIG. 6 is a diagram illustrated an example of a prespecified list of category labels.

In the example, such category labels in the prespecified list include "Greeting", "Break", "Customer Info", "Product", "Demo", "Pricing/License", "Account", "General Discussion", and "Closing". In some embodiments, one or more of these category labels can be assigned via the steps for assigning category labels described above with respect to FIG. 2.

Figure 7:
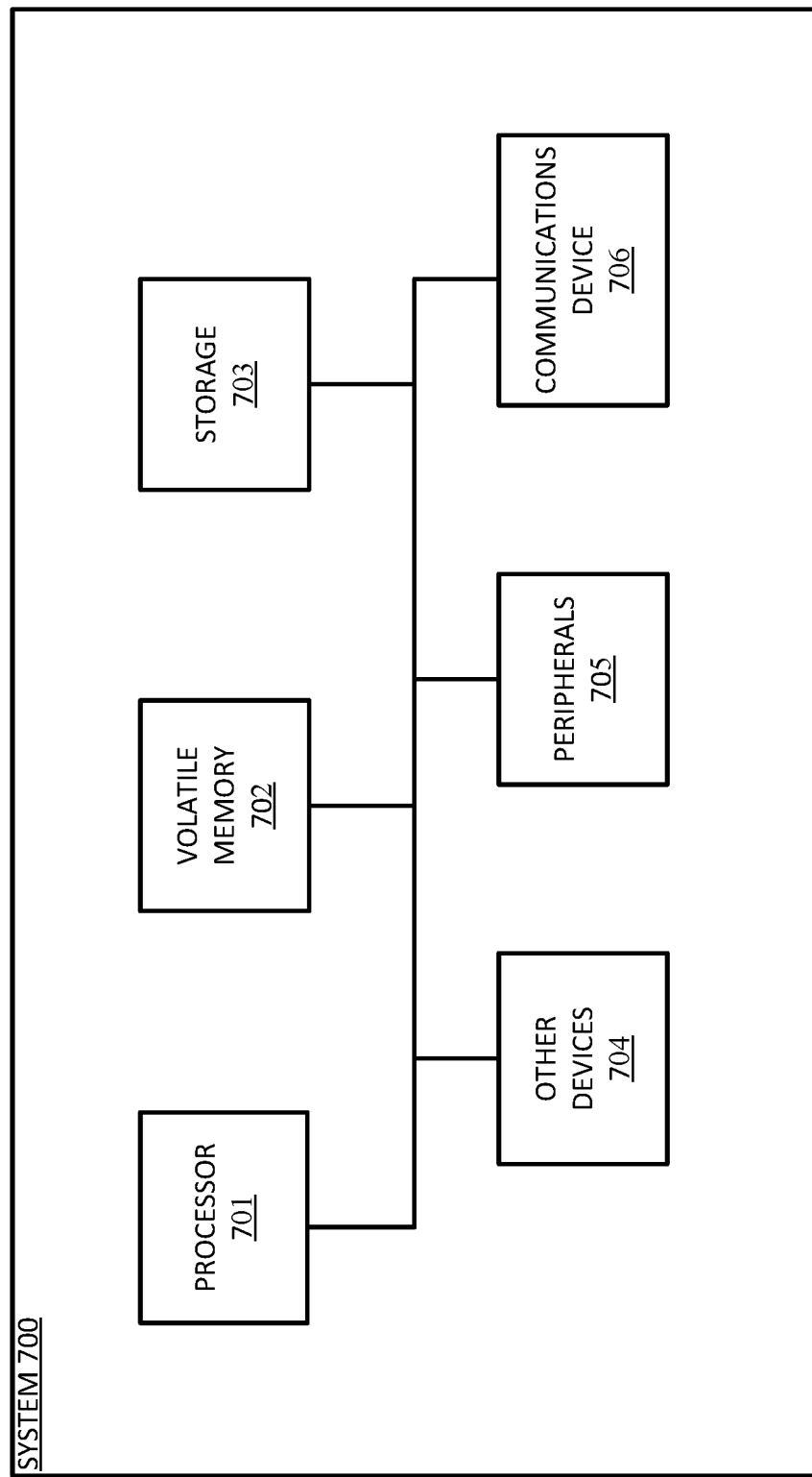
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1. A method, comprising: receiving a transcript and video content of a conversation between the participants produced during the communication session, the transcript comprising timestamps for a plurality of utterances associated with speaking participants; processing the video content to extract one or more pieces of textual content visible within the frames of the video content; segmenting frames of the video content into a plurality of contiguous topic segments; determining a title for each topic segment from one or more of: the transcript, and the extracted textual content; assigning a category label for each topic segment from a prespecified list of category labels; receiving, from a client device associated with a user, a request to search for specified text within the video content; in response to receiving the request, determining one or more titles or category labels for which a prediction of relatedness with the specified text is present; and presenting, to the client device, content from at least one topic segment associated with the one or more titles or category labels for which a prediction of relatedness is present.

Example 2. The method of example 1, wherein the content comprises playback of video of the meeting at a timestamp associated with the at least one topic segment associated with the titles or category labels for which a prediction of relatedness is present.

Example 3. The method of any of examples 1-2, wherein processing the video content to extract one or more pieces of textual content comprises: extracting, via optical character recognition (OCR), a plurality of textual content from the frames of the video content, each piece of textual content comprising a timestamp representing a temporal location of the frame within the video content.

Example 4. The method of any of examples 1-3, wherein the determined title for a topic segment is an empty or null title.

Example 5. The method of any of examples 1-4, wherein presenting the content from at least one topic segment comprises: presenting the frames from the topic segments associated with each title or category label for which a prediction of relatedness is present, Example 6. The method of example 5, wherein related titles and category labels are visually highlighted within any presented frame in which they appear.

Example 7. The method of any of examples 1-6, wherein determining one or more titles or category labels for which a prediction of relatedness with the specified text is present comprises determining one or more exact matches between a title or category label and the specified text.

Example 8. The method of any of examples 1-7, wherein determining that a prediction of relatedness with a specified text is present comprises determining one or more exact matches between titles or category labels and a spell-corrected version of the specified text.

Example 9. The method of any of examples 1-8, wherein determining that a prediction of relatedness with a specified text is present comprises determining one or more non-exact matches with the specified text.

Example 10. The method of any of examples 1-9, wherein determining that a prediction of relatedness with a specified text is present is based on one or more of: entity extraction techniques, relationship embedding techniques, and matching synonyms.

Example 11. The method of any of examples 1-10, further comprising: ranking the pieces of textual content for which a prediction of relatedness is present based on a relevance score, wherein the pieces of textual content are presented to the client device in order of ranking.

Example 12. The method of example 11, wherein the relevance score is based on one or more of: the specified text, user preferences, user behavior, user search history, and popularity of the matching piece of textual content.

Example 13. The method of any of examples 1-12, wherein the content from the topic segments associated with titles or category labels for which a prediction of relatedness is present are presented to the client device in chronological order based on the associated timestamps.

Example 14. The method of any of examples 1-13, wherein the one or more processors are further configured to perform the operation of: processing the video content to extract, via optical character recognition (OCR), one or more titles visible within the frames of the video content.

Example 15. The method of any of examples 1-14, wherein the one or more processors are further configured to perform the operation of: merging one or more neighboring segments according to one or more merging rules.

Example 16. The method of any of examples 1-15, wherein assigning the category label for each topic segment is performed using one or more of: named entity masking techniques, topic inference techniques, and post-processing rules.

Example 17. The method of any of examples 1-16, wherein assigning the category label for each topic segment is performed using one or more trained artificial intelligence (AI) models, the training of the AI models being performed using unsupervised clustering techniques.

Example 18. The method of any of examples 1-17, wherein processing the video content to extract the one or more pieces of textual content comprises: extracting high-resolution versions and low-resolution versions of frames from the video content, and extracting, via OCR, the textual content from the high-resolution versions of low-resolution distinguishing frames containing text.

Example 19. A communication system comprising one or more processors configured to perform the operations of: receiving a transcript and video content of a conversation between the participants produced during the communication session, the transcript comprising timestamps for a plurality of utterances associated with speaking participants; processing the video content to extract one or more pieces of textual content visible within the frames of the video content; segmenting frames of the video content into a plurality of contiguous topic segments; determining a title for each topic segment from one or more of: the transcript, and the extracted textual content; assigning a category label for each topic segment from a prespecified list of category labels; receiving, from a client device associated with a user, a request to search for specified text within the video content; in response to receiving the request, determining one or more titles or category labels for which a prediction of relatedness with the specified text is present; and presenting, to the client device, content from at least one topic segment associated with the one or more titles or category labels for which a prediction of relatedness is present.

Example 20. The communication system of example 19, wherein the content comprises playback of video of the meeting at a timestamp associated with the at least one topic segment associated with the titles or category labels for which a prediction of relatedness is present.

Example 21. The communication system of any of examples 19-20, wherein processing the video content to extract one or more pieces of textual content comprises: extracting, via optical character recognition (OCR), a plurality of textual content from the frames of the video content, each piece of textual content comprising a timestamp representing a temporal location of the frame within the video content.

Example 22. The communication system of any of examples 19-21, wherein the determined title for a topic segment is an empty or null title.

Example 23. The communication system of any of examples 19-22, wherein presenting the content from at least one topic segment comprises: presenting the frames from the topic segments associated with each title or category label for which a prediction of relatedness is present, Example 24. The communication system of example 23, wherein related titles and category labels are visually highlighted within any presented frame in which they appear.

Example 25. The communication system of any of examples 19-24, wherein determining one or more titles or category labels for which a prediction of relatedness with the specified text is present comprises determining one or more exact matches between a title or category label and the specified text.

Example 26. The communication system of any of examples 19-25, wherein determining that a prediction of relatedness with a specified text is present comprises determining one or more exact matches between titles or category labels and a spell-corrected version of the specified text.

Example 27. The communication system of any of examples 19-26, wherein determining that a prediction of relatedness with a specified text is present comprises determining one or more non-exact matches with the specified text.

Example 28. The communication system of any of examples 19-27, wherein determining that a prediction of relatedness with a specified text is present is based on one or more of: entity extraction techniques, relationship embedding techniques, and matching synonyms.

Example 29. The communication system of any of examples 19-28, wherein the one or more processors are further configured to perform the operation of: ranking the pieces of textual content for which a prediction of relatedness is present based on a relevance score, wherein the pieces of textual content are presented to the client device in order of ranking.

Example 30. The communication system of example 29, wherein the relevance score is based on one or more of: the specified text, user preferences, user behavior, user search history, and popularity of the matching piece of textual content.

Example 31. The communication system of any of examples 19-30, wherein the content from the topic segments associated with titles or category labels for which a prediction of relatedness is present are presented to the client device in chronological order based on the associated timestamps.

Example 32. The communication system of any of examples 19-31, wherein the one or more processors are further configured to perform the operation of: processing the video content to extract, via optical character recognition (OCR), one or more titles visible within the frames of the video content.

Example 33. The communication system of any of examples 19-32, wherein the one or more processors are further configured to perform the operation of: merging one or more neighboring segments according to one or more merging rules.

Example 34. The communication system of any of examples 19-33, wherein assigning the category label for each topic segment is performed using one or more of: named entity masking techniques, topic inference techniques, and post-processing rules.

Example 35. The communication system of any of examples 19-34, wherein assigning the category label for each topic segment is performed using one or more trained artificial intelligence (AI) models, the training of the AI models being performed using unsupervised clustering techniques.

Example 36. The communication system of any of examples 19-35, wherein processing the video content to extract the one or more pieces of textual content comprises: extracting high-resolution versions and low-resolution versions of frames from the video content, and extracting, via OCR, the textual content from the high-resolution versions of low-resolution distinguishing frames containing text.

Example 37. A non-transitory computer-readable medium containing instructions comprising: instructions for receiving a transcript and video content of a conversation between the participants produced during the communication session, the transcript comprising timestamps for a plurality of utterances associated with speaking participants; instructions for processing the video content to extract one or more pieces of textual content visible within the frames of the video content; instructions for segmenting frames of the video content into a plurality of contiguous topic segments; instructions for determining a title for each topic segment from one or more of: the transcript, and the extracted textual content; instructions for assigning a category label for each topic segment from a prespecified list of category labels; instructions for receiving, from a client device associated with a user, a request to search for specified text within the video content; in response to receiving the request, instructions for determining one or more titles or category labels for which a prediction of relatedness with the specified text is present; and instructions for presenting, to the client device, content from at least one topic segment associated with the one or more titles or category labels for which a prediction of relatedness is present.

Example 38. The non-transitory computer-readable medium of example 37, wherein the content comprises playback of video of the meeting at a timestamp associated with the at least one topic segment associated with the titles or category labels for which a prediction of relatedness is present.

Example 39. The non-transitory computer-readable medium of any of examples 37-38, wherein processing the video content to extract one or more pieces of textual content comprises: extracting, via optical character recognition (OCR), a plurality of textual content from the frames of the video content, each piece of textual content comprising a timestamp representing a temporal location of the frame within the video content.

Example 40. The non-transitory computer-readable medium of any of examples 37-39, wherein the determined title for a topic segment is an empty or null title.

Example 41. The non-transitory computer-readable medium of any of examples 37-40, wherein presenting the content from at least one topic segment comprises: presenting the frames from the topic segments associated with each title or category label for which a prediction of relatedness is present, Example 42. The non-transitory computer-readable medium of example 41, wherein related titles and category labels are visually highlighted within any presented frame in which they appear.

Example 43. The non-transitory computer-readable medium of any of examples 37-42, wherein determining one or more titles or category labels for which a prediction of relatedness with the specified text is present comprises determining one or more exact matches between a title or category label and the specified text.

Example 44. The non-transitory computer-readable medium of any of examples 37-43, wherein determining that a prediction of relatedness with a specified text is present comprises determining one or more exact matches between titles or category labels and a spell-corrected version of the specified text.

Example 45. The non-transitory computer-readable medium of any of examples 37-44, wherein determining that a prediction of relatedness with a specified text is present comprises determining one or more non-exact matches with the specified text.

Example 46. The non-transitory computer-readable medium of any of examples 37-45, wherein determining that a prediction of relatedness with a specified text is present is based on one or more of: entity extraction techniques, relationship embedding techniques, and matching synonyms.

Example 47. The non-transitory computer-readable medium of any of examples 37-46, further comprising: ranking the pieces of textual content for which a prediction of relatedness is present based on a relevance score, wherein the pieces of textual content are presented to the client device in order of ranking.

Example 48. The non-transitory computer-readable medium of example 47, wherein the relevance score is based on one or more of: the specified text, user preferences, user behavior, user search history, and popularity of the matching piece of textual content.

Example 49. The non-transitory computer-readable medium of any of examples 37-48, wherein the content from the topic segments associated with titles or category labels for which a prediction of relatedness is present are presented to the client device in chronological order based on the associated timestamps.

Example 50. The non-transitory computer-readable medium of any of examples 37-49, wherein the one or more processors are further configured to perform the operation of: processing the video content to extract, via optical character recognition (OCR), one or more titles visible within the frames of the video content.

Example 51. The non-transitory computer-readable medium of any of examples 37-50, wherein the one or more processors are further configured to perform the operation of: merging one or more neighboring segments according to one or more merging rules.

Example 52. The non-transitory computer-readable medium of any of examples 37-51, wherein assigning the category label for each topic segment is performed using one or more of: named entity masking techniques, topic inference techniques, and post-processing rules.

Example 53. The non-transitory computer-readable medium of any of examples 37-52, wherein assigning the category label for each topic segment is performed using one or more trained artificial intelligence (AI) models, the training of the AI models being performed using unsupervised clustering techniques.

Example 54. The non-transitory computer-readable medium of any of examples 37-53, wherein processing the video content to extract the one or more pieces of textual content comprises: extracting high-resolution versions and low-resolution versions of frames from the video content, and extracting, via OCR, the textual content from the high-resolution versions of low-resolution distinguishing frames containing text.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:
1. A method, comprising:
receiving video content of a conversation between participants produced during a communication session;
performing video-based segmentation on the video content to classify a category label from a list of category labels for each video frame of the video content, the video content comprising a plurality of topic segments each associated with a different title and category label;
receiving, from a client device associated with a user, a request to search for specified text within the video content;

in response to receiving the request, determining one or more of the titles or category labels for which a prediction of relatedness with the specified text is present; and presenting, to the client device, content from at least one topic segment associated with the one or more titles or category labels for which a prediction of relatedness is present.

2. The method of claim 1, wherein each topic segment is associated with a starting timestamp, and wherein the content comprises playback of video of the communication session at a starting timestamp associated with the at least one topic segment associated with the titles or category labels for which a prediction of relatedness is present.

3. The method of claim 1, wherein the title associated with each topic segment was determined via performing optical character recognition (OCR) on one or more frames within the topic segment.

4. The method of claim 1, wherein the title associated with a topic segment is an empty or null title.

5. The method of claim 1, wherein presenting the content from at least one topic segment comprises:
presenting one or more frames from the at least one topic segment associated with each title or category label for which a prediction of relatedness is present.

6. The method of claim 5, wherein related titles and category labels are visually highlighted within any presented frame from the topic segment in which they appear.

7. The method of claim 6, wherein determining that a prediction of relatedness with a specified text is present is based on one or more of: entity extraction techniques, relationship embedding techniques, and matching synonyms.

8. The method of claim 1, wherein determining one or more titles or category labels for which a prediction of relatedness with the specified text is present comprises determining one or more exact matches between a title or category label and the specified text.

9. The method of claim 1, wherein determining that a prediction of relatedness with a specified text is present comprises determining one or more exact matches between titles or category labels and a spell-corrected version of the specified text.

10. The method of claim 1, wherein determining that a prediction of relatedness with a specified text is present comprises determining one or more non-exact matches with the specified text.

11. The method of claim 1, wherein the content from the topic segments associated with titles or category labels for which a prediction of relatedness is present are presented to the client device in chronological order based on associated timestamps.

12. A communication system comprising one or more processors configured to perform operations of:
receiving video content of a conversation between participants produced during a communication session;
performing video-based segmentation on the video content to classify a category label from a list of category labels for each video frame of the video content, the video content comprising a plurality of topic segments each associated with a different title and category label;
receiving, from a client device associated with a user, a request to search for specified text within the video content;
in response to receiving the request, determining one or more of the titles or category labels for which a prediction of relatedness with the specified text is present; and
presenting, to the client device, content from at least one topic segment associated with the one or more titles or category labels for which a prediction of relatedness is present.

13. The communication system of claim 12, wherein each topic segment is associated with a starting timestamp, and wherein the content comprises playback of video of the communication session at a starting timestamp associated with the at least one topic segment associated with the titles or category labels for which a prediction of relatedness is present.

14. The communication system of claim 12, wherein the title associated with each topic segment was determined via performing optical character recognition (OCR) on one or more frames within the topic segment.

15. The communication system of claim 12, wherein the title associated with a topic segment is an empty or null title.

16. The communication system of claim 12, wherein presenting the content from at least one topic segment comprises:
presenting one or more frames from the at least one topic segment associated with each title or category label for which a prediction of relatedness is present.

17. The communication system of claim 16, wherein related titles and category labels are visually highlighted within any presented frame from the topic segment in which they appear.

18. The communication system of claim 12, wherein determining one or more titles or category labels for which a prediction of relatedness with the specified text is present comprises determining one or more exact matches between a title or category label and the specified text.

19. The communication system of claim 12, wherein determining that a prediction of relatedness with a specified text is present comprises determining one or more exact matches between titles or category labels and a spell-corrected version of the specified text.

20. A non-transitory computer-readable medium containing instructions comprising:
instructions for receiving video content of a conversation between participants produced during a communication session;
performing video-based segmentation on the video content to classify a category label from a list of category labels for each video frame of the video content, the video content comprising a plurality of topic segments each associated with a different title and category label;
instructions for receiving, from a client device associated with a user, a request to search for specified text within the video content;
in response to receiving the request, instructions for determining one or more of the titles or category labels for which a prediction of relatedness with the specified text is present; and
instructions for presenting, to the client device, content from at least one topic segment associated with the one or more titles or category labels for which a prediction of relatedness is present.

* * * * *